United States Patent Office

3,637,579
Patented Jan. 25, 1972

3,637,579
POLYEPOXIDE-POLYANHYDRIDE ADHESIVE COMPOSITION
Walter P. Barie, Jr., Shaler Township, and Norman W. Franke, Penn Hills Township, Allegheny County, Pa., assignors to Gulf Research & Development Company, Pittsburgh, Pa.
No Drawing. Filed Dec. 18, 1969, Ser. No. 886,392
Int. Cl. C08f *45/04;* C08g *51/04*
U.S. Cl. 260—41 A
11 Claims

ABSTRACT OF THE DISCLOSURE

An adhesive composition containing a copolymer of a straight chain mono-alpha-olefin and maleic anhydride, a liquid polyepoxide, and a powdered filler. The adhesive is useful for bonding solid elements, such as metal, together.

---

This invention relates to thermo-curable adhesive compositions, preferably those in which a curing reaction is initiated at an elevated temperature such as about 100° to about 120° C. In particular, these compositions comprise a spreadable mixture of a liquid polyepoxide, a solid copolymer of maleic anhydride and certain straight chain mono-alpha-olefins and suitable fillers.

Of the many types of adhesive compositions in the art, the epoxy resins, obtained by the cross-linking of polyepoxide compounds with various cross-linking agents, have received a substantial amount of attention from those working in the art, as have resins prepared from reactants including dianhydrides and monoepoxy compounds. In laminating or adhering objects together, it is important that the adhesive materials have good curing properties and the final products must have the desired physical and chemical characteristics such as good adhesion and resistance to solvents. Thus, during curing, it is important that little or no shrinkage takes place. Another disadvantage which may appear is a loss in weight during curing, apparently due to volatilization of ingredients. Other important characteristics are flexural strength and toughness, pot life of the liquid adhesive, heat distortion temperature, curing time, particularly at relatively low temperatures, and dimensional uniformity of the end cured product. Particular importance is attached to the necessity for a high tensile lap shear strength of the adhesive bonds.

As disclosed in copending, Ser. No. 691,340 of common assignment herewith, room temperature curing adhesives having many of the desirable characteristics set out above can be prepared from liquid solutions of monoepoxy compounds and copolymers of maleic anhydride and certain straight chain mono-alpha-olefins, together with suitable filler materials. However, it was believed that such advantageous results could not be attained with the use of polyepoxides as contrasted with monoepoxides as covered in the above copending application since the above-mentioned solid copolymers of maleic anhydride and mono-alpha-olefins are insoluble in polyepoxide resins at room temperature. Furthermore, it was known that attempts to increase the solubility of the copolymers in liquid polyepoxides by heating the polyepoxides and then adding the copolymers at higher temperatures had resulted in a partial cure to a rubbery, gel-like material which is incapable of further curing to a satisfactory product.

It has now been found that stable, heat-curable adhesives having excellent properties including those discussed above, can be obtained from a polyepoxide and copolymers of maleic anhydride and certain mono-alpha-olefins by intimately mixing the liquid polyepoxide and solid copolymer, for example, by milling, to form a homogeneous, finely dispersed mixture of powdered polyanhydride in the polyepoxide prior to subjecting the mixture to heat. The more intimate the dispersion, that is, the finer the particle size of the copolymer and the better it is distributed in the polyepoxide, the more suited it is for the cross-linking copolymerization of the solid polyanhydride copolymer and the polyepoxide. It has also been found that such homogeneous mixtures can be heat cured at relatively low temperatures as low as about 100°–120° C. or lower and that premature gelation will not occur. Furthermore, it has been found that the desirability of employing a curing accelerator, such as N,N-dimethylbenzylamine, is dependent upon the number of carbon atoms in the olefinic portion of the polyanhydride cross-linking agent, and that while certain mixtures will not cure in the absence of an accelerator, others will result in inferior adhesives if an accelerator is employed.

Thus, it has been found that stable, heat curable adhesives which will not cure prematurely to a rubbery substance and which have acceptably long pot lives, as well as a high tensile lap shear strength, etc., are obtained when a powdered polyanhydride prepared from maleic anhydride and certain mono-alpha-olefins is intimately admixed with a liquid polyepoxide and reacted therewith at an elevated temperature such as about 100°–120° C. In accordance with the present invention, preferred adhesive compositions comprise the reaction product of the above-described polyanhydride with a liquid polyepoxide, when the following conditions are present:

(1) The use of a straight-chain alpha-olefin having between 2 and 20 carbon atoms rather than a branched-chain alpha-olefin;

(2) The use of a solid alpha-olefin-maleic anhydride copolymer having a dilute solution viscosity between about 0.05 and about 2.0;

(3) The use of a powdered filler comprising at least 30 and preferably 60 parts per hundred parts (phr.) of the polyepoxide;

(4) The use of an anhydride to epoxide molar ratio between about 0.1 and 1.5, more preferably between about 0.3 and 1.0; and (5) The use of a suitable accelerator such as a tertiary amine accelerator when the olefinic portion of the solid polyanhydride copolymer comprises between 2 and 5 carbon atoms per molecule, the amount of accelerator being at least 0.5 phr. of the polyepoxide.

The solid polyanhydride is prepared by the copolymerization of maleic anhydride with monoolefins. The monoolefins are defined in U.S. Pat. No. 3,374,209 beginning at column 6, line 3 and extending to column 7, line 28, which disclosure is incorporated herein as a part of the present disclosure. The preferred monoolefin is an alpha-olefin represented by the following general formula:

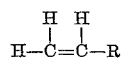

where R is hydrogen, halogen or a straight chain alkyl or halogenated alkyl radical having from 1 to about 18 carbon atoms.

It is understood that the term "olefin" is meant to include mixtures of monoolefins. While only one olefinic bond per molecule is present in the olefin since more than one double bond per molecule promotes gel formation and internal cross-linking, minor amounts of diolefins, of the order of two percent or less, can be tolerated.

Examples of olefin compounds or mixtures of olefins which are preferred to form the solid polyanhydride components of the compositions of this invention include: 1-propene, 1-butene, 1-pentene, 1-hexene, 1-heptene, 1-octene, 1-nonene, 1-decene, 5-chlorohexene-1, 1-undercene, 1-dodecene, 1-tridecene, 1-tetradecene, 1-octadecene, and mixtures thereof, etc.

A general formula for the solid polyanyhydride can be represented by the general formula:

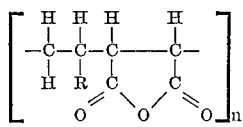

wherein n is an integer of from 2 to about 100, R is hydrogen, halogen or a straight chain alkyl or halogenated alkyl group having from 1 to about 18 carbon atoms.

The copolymerization can be conducted in any suitable manner. One suitable copolymerization procedure involves contacting the olefinic compound with the maleic anhydride in a suitable solvent in the presence of a free radical producing catalyst, such as a peroxide. The molar ratio of the mono-alpha-olefin to maleic anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used, in which case much lower temperatures, i.e. −80° C., can be employed. The upper reaction temperature is determined by the boiling point of the components of the reaction mixture and the predominance of unwanted side reaction.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g. or higher, but the preferred pressure is atmospheric.

The copolymers can be produced in any suitable solvent which at least partially dissolves both of the reaction components. Suitable solvents include, for example: n-pentane, n-hexane, n-octane, toluene, benzene, cumene, xylene, anisole, acetone, tetrahydrofuran, cyclohexane, n-propylacetate, ethylbenzene, di-n-butylether, n-amylacetate, cyclohexanone, bromobenzene, ethylbenzylether, etc., methylene chloride, di-isopropyl ether, carbon tetrachloride, methylcyclohexane, ethyl-n-butyrate, tetrachloroethylene, methylorthotolylether, methylethylketone.

The catalyst to employ can be any free radical producing material well known in the art. Preferred catalysts are the organic peroxides, such as benzoyl, lauryl and tertiary butyl peroxide. Other suitable free radical producing materials include substituted azo compounds, such as alpha-alpha'-azobis-isobutyronitrile.

The molecular weight of the polyanhydride component of the compositions of this invention is desirably within a relatively limited range as defined by dilute solution viscosity. In this regard, it is preferred that the dilute solution viscosity (which is a measure of molecular weight) of five grams of the polyanhydride per deciliter of acetone at 77° F. be between about 0.05 and 2.0. Lower or higher values have been found to produce less satisfactory adhesives, although such resins may be more useful for other purposes.

The adhesive composition of the present invention also comprises a liquid polyepoxide also called epoxy resin which may consist of one or more of the various commercially available liquid polyepoxides. These materials are well defined in United States Pat. No. 3,326,856 beginning at column 1, line 55 and extending to column 3, line 25, which disclosure is incorporated herein as a part of the present disclosure. The glycidyl ether type and cycloaliphatic polyepoxides are well known polyepoxides which are very useful herein. The glycidyl ethers of epichlorohydrin and bisphenol A are useful polyepoxides herein which are commercially available in large quantities and are relatively inexpensive.

An essential feature of the compositions of this invention is the intimate admixture of the solid polyanhydride in the liquid polyepoxide to form a finely dispersed, homogeneous suspension which is spreadable at about room temperature, i.e. at temperatures between about 10° and 30° C., and which will cure at elevated temperatures such as about 100° to about 120° C. without premature gelation to a rubbery material. In this regard, it is necessary that the polyanhydride-polyepoxide admixture be in the form of a homogeneous suspension in order to obtain a hard, infusible resin which is non-grainy and has excellent solvent resistance properties together with good flexural strength and heat distortion temperature.

The nature of the cured adhesive compositions and the time required for their cure depend, among other things, upon the ratio of anhydride equivalent of the polyanhydride relative to the polyepoxide compound being employed. In this regard, the anhydride equivalent of the polyanhydride is defined as the average number of anhydride groups per molecule. Thus, in order to form the thermosetting compositions of the present invention, the polyanhydride must have an anhydride equivalency of at least two, that is the polyanhydride must have at least two anhydride groups per molecule, and the anhydride group to epoxide group ratio, known more simply as the A/E ratio, should vary between about 0.1 and 1.5, preferably between about 0.3 and 1.0.

One of the features of the adhesive compositions of this invention is that they must be heated to an elevated temperature such as about 100° C. to initiate the cross-linking or curing thereof. A hardening or curing of the resins can suitably be effected at a temperature between about 100° C. and 120° C. at atmospheric pressure. Higher pressures can be used if desired, but provide no additional benefits. Higher curing temperatures, for example, up to 200° C. or more can be used and such higher curing temperatures are often preferred. If so desired, curing may take place in two stages, a first stage at a low temperature, and a second stage at a higher temperture.

The time for curing or hardening of the liquid compositions of this invention will vary over a wide range, depending on the reactivity of the particular polyepoxides and polyanhydrides employed. Generally speaking, however, the time for curing may vary between a few minutes and a few days, and normally between about 1 to 30 hours. In this connection, an accelerator, as discussed more fully hereinbelow, may be required to affect curing in a reasonable time.

It has been found that the curing or cross-linking reaction requires the use of an accelerator when the olefinic portion of the polyanhydride contains 2 to about 5 carbon atoms per molecule. On the other hand, it has been found that the use of an accelerator actually tends to decrease the adhesive qualities of the cured composition when the olefin employed in forming the polyanhydride contains greater than about 6 carbon atoms per molecule.

With respect to the compositions of the present invention in which the use of an accelerator is preferred or required, it has been found that soluble tertiary amines as a class are suitable in accelerating the curing of the compositions to solids of desired hardness. These tertiary amine accelerating agents are fully described in United States Pat. No. 3,374,209 beginning at column 11, line 58 and extending to column 13, line 38, which disclosure is incorporated herein as a part of the present disclosure. When an accelerator is used, we prefer to use N,N-dimethylbenzylamine or tris(dimethylaminomethyl)phenol.

Other than when the adhesive compositions of the present invention contain polyanhydrides having greater than about five carbon atoms per molecule in the olefinic portion thereof, the maximum amount of the tertiary amine accelerator to employ is not critical. The minimum amount, however, is critical, especially when the olefinic portion of the polyanhydride contained in the respective composition contains from about 2 to about 5 carbon atoms per molecule. In this connection, at least about 0.5 part of tertiary amine per hundred parts of the polyepoxide must be employed. Thus, amounts of from 0.5 to 20 parts of amine catalyst per 100 parts of polyepoxide are satisfactory, while the preferred range of accelerator concentration is between 0.5 and 5 parts of amine catalyst per 100 parts of polyepoxide. The more amine catalyst that is used, the faster is the rate of the exothermic curing reaction. When the higher concentration of tertiary amine is employed, it is preferred that means also be employed to remove the exothermic heat of reaction to avoid any possible charring of the product. Generally speaking, the use of a tertiary amine accelerator and particularly the use of the alkyl substituted anilines and pyridines results in much faster cures.

The method of addition of the tertiary amines accelerators is not necessarily critical, but it is preferred to add the accelerator to the mixture of the polyanhydride and polyepoxide after the polyanhydride hardener has been homogeneously suspended in the polyepoxide and before the mixture is heated to the desired curing temperature. In this manner, there is no danger of inadvertently causing premature gelation or hardening of the mixture before the homogenization thereof. Consequently, there will be no danger of having a cured adhesive having a grainy composition with inferior chemical and physical properties.

Another essential component of the adhesive composition is a powdered filler, preferably a metal powder, the amount thereof being critical. Suitable fillers include, but are not limited to, aluminum, copper, iron, steel, stainless steel, nickel, lead, zinc, tin, and alloys thereof, as well as aluminum oxide, asbestos, talc, iron oxide, calcium sulfate, titanium dioxide and ground glass. Such fillers are necessary to provide good control over the flowability of the adhesive compositions and to ensure decreased shrinkage thereof. The quantity of filler by weight based on the weight of polyepoxide being used must be at least 30 phr. and preferably at least 60 phr. (parts per hundred parts of polyepoxide). As much as 200 phr. of the filler is useful. The most preferred range is from about 80 to about 100 phr. It is preferred that the powdered filler be below 100 mesh and above 325 mesh (U.S. Sieve Series) in size for best results. The preferred filler is aluminum powder. It is further preferred that finely divided silica be used as a filler in combination with the aluminum powder. The minimum amount of said silica, when it is present, is 1 phr. based on the weight of the polyepoxide and the maximum amount of about 140 phr. The preferred range is about 10 to 20 phr. The total combined amounts of metal powder and silica powder should not exceed 200 phr. Modifiers such as water, alcohols, glycols, anhydrides, flexibilizers and other resins such as nylon and phenolics may also be added, if desired, in amounts of from about 0.1 to about 5 percent, to improve handling or to alter certain properties of the cured adhesives.

The filler material and modifiers, if such are employed, can be added to the other components of the adhesive composition in essentially any order. However, they are preferably added after suspension of the maleic anhydride-olefin copolymer in the polyepoxide.

This invention will be further described with relation to the specific examples to be given below.

In the examples to follow, the polyanhydride compound was prepared by the copolymerization of maleic anhydride and an alpha-olefin having between 2 and 20 carbon atoms per molecule. These copolymers were prepared by reacting the desired olefin and maleic anhydride in a molar ratio of 2:1 in the liquid phase in the presence of a mutual solvent at a temperature between 60° and 100° C. using as a catalyst between 2 and 3 weight percent of benzoyl peroxide based on the maleic anhydride. The copolymer was then (1) separated from the solvent and any residual catalyst, and (2) dried. Infrared analysis and nuclear magnetic resonance data indicated that the alpha-olefin and maleic anhydride combined in a 1:1 molar ratio. The dilute solution viscosities of the copolymers measured by dissolving the copolymer in the ratio of 5 grams to a deciliter of acetone, measured at 77° F. was between 0.05 and 2.00 as used in the examples below. Unless otherwise specified, the adhesive layers were about 3 to 10 mils thick.

EXAMPLES

The solid maleic anhydride-olefin copolymer was mixed at room temperature with a diepoxide produced by the condensation of epichlorohydrin with Bisphenol A and sold by the Shell Chemical Company under the trade name "Epon 828." The polyanhydride-diepoxide mixture was passed through a Ross 3-roll mill for three to five cycles to form a stable, homogeneous suspension. The $A/E$ ratio was 0.5 unless otherwise specified. The fillers were added to the homogeneous maleic anhydride-olefin copolymer suspension in diepoxide and mixed, using an ordinary mechanical mixer. The adhesive was applied to a previously cleaned aluminum or Cor-ten steel plate and another plate of the same material was lapped thereover and clamped thereto in accordance with the procedure for determining tensile lap shear strength by ASTM D 1002. The thickness of each plate was 0.0625 inch. The adhesive was then cured at the indicated temperature for the indicated number of hours. As used in the following tables of examples, the meaning of certain abbreviations and phrases is as follows:

Al—Al=aluminum to aluminum bond.
St—St=Cor-ten steel to Cor-ten steel bond; Cor-ten steel is a high strength steel which possesses a high resistance to atmospheric corrosion.
Al=Reynolds 120 atomized aluminum powder.
Si or "Cab-O-Sil"=finely divided pyrogenic colloidal silica filler.
phr.=parts by weight per hundred parts of polyepoxide.
$MAC_x$=maleic anhydride-straight chain alpha-olefin, the $x$ referring to the number of carbon atoms in the $\alpha$-olefin; e.g., $MAC_3$ is the copolymer of maleic anhydride and propylene and $MAC_6$ is the copolymer of maleic anhydride and hexene-1.
Shear, p.s.i.=tensile lap shear strength, ASTM D 1002.
D.S.V.=Dilute solution viscosity, as determined with 5.0 g. of $MAC_x$—copolymer resin per deciliter of acetone at 77° F.

Because the method of preparing the surface of the articles or laminae bonded to one another has a great deal of influence upon the strength of the bond, the method of cleaning such surfaces is specified in each of the examples.

In the examples set out in Table I, a polyanhydride to polyepoxide (Epon 828) ratio ($A/E$) of 0.5 was used without accelerator. The mixture was applied to Cor-ten steel laminae which had been cleaned in the following steps (a) rinsing in trichloroethylene and drying, (b) dipping in a mixture containing 10 percent by volume concentrated sulfuric acid, 10 percent by volume concentrated nitric acid in water, then water rinsing, (c) dipping in a mixture containing 50 percent by volume concentrated hydrochloric acid, 2 percent by volume of 30 percent hydrogen peroxide in water, then water rinsing and (d) oven drying. Each sample was cured at 200° C. for two hours. The results of these experiments are set out in Table I.

TABLE I

| Example | 1 | 2 | 3 | 4 |
|---|---|---|---|---|
| $MAC_6$, g | 9.6 | 9.6 | | |
| $MAC_{18}$, g | | | 18.5 | 18.5 |
| Polyepoxide, g | 20.0 | 20.0 | 20.0 | 20.0 |
| Al, phr | 80 | 100 | 30 | 100 |
| Si, phr | 15 | 15 | 15 | 15 |
| Shear, p.s.i | 2,311 | 2,205 | 1,826 | 2,308 |

It is noted that these compositions produce adhesive bonds of suitable strength.

A second series of experiments were carried out using an adhesive mixture containing 9.6 g. of $MAC_6$ and 20.0 g. of Epon 828 at an $A/E$ ratio of 0.5 without accelerator. The adhesives were cured at 120° C. for 24 hours. The results are set forth in Table II as well as the metal cleaning treatment used in each example.

TABLE II

| Example | 5 | 6 | 7 | 8 | 9 |
|---|---|---|---|---|---|
| Filler: | | | | | |
| Al, phr | 80 | 100 | 80 | 100 | 80 |
| Si, phr | 15 | 15 | 15 | 15 | 15 |
| Bond | St—St | St—St | St—St | Al—Al | Al—Al |
| Cleaning treatment | 1 | 1 | 2 | 3 | 3 |
| Shear, p.s.i | 1,778 | 2,976 | 2,035 | 1,465 | 1,495 |

Metal treatments (1) Same as Examples 1 through 4.
(2) Sandblasted.
(3) (a) Trichloroethylene rinse, (b) dip in mixture of 20 parts $H_2SO_4$, 10 parts $Na_2Cr_2O_7$, 70 parts $H_2O$, (c) water wash, (d) oven dry.

Table II shows several important variables and their effect on lap shear strength. First of all, the same formulation of $MAC_6$ and Epon 828 gives a much greater shear strength when used with steel as opposed to aluminum. Thus, when Cor-ten steel is used (Examples 5 through 7) a maximum lap shear strength of 2,976 p.s.i. was obtained as compared to a maximum lap shear strength of 1,495 p.s.i. for aluminum. Secondly, a comparison between Examples 5 and 6 and Examples 8 and 9 indicates that lap shear strength for Cor-ten steel but not aluminum increases with an increase in filler content. In this connection, while the lap shear strength for aluminum appears to be relatively independent of the filler concentration (so long as at least 60 phr. is employed), the shear strength of the Cor-ten steel bond was increased by almost 70 percent when the combined Al and Si filler content was increased from 95 to 115 phr. Finally, comparison of Examples 6 and 7 indicates that the lap shear strength of a Cor-ten steel lamina is affected by the manner in which the steel was cleaned or treated before bonding.

A further series of experiments, identical with those described in Table II, were carried out except that $MAC_{18}$ was used as the polyanhydride. The adhesive was made up from 18.5 g. of $MAC_{18}$ and 20 g. of Epon 828. The results are set forth in Table III in which the metal cleaning procedures are described in association with Table II.

TABLE III

| Example | 10 | 11 | 12 | 13 | 14 |
|---|---|---|---|---|---|
| Filler: | | | | | |
| Al, phr | 80 | 100 | 80 | 100 | 100 |
| Si, phr | 15 | 15 | 15 | 15 | 15 |
| Bond | St—St | St—St | St—St | Al—Al | Al—Al |
| Cleaning treatment | 1 | 1 | 2 | 3 | 3 |
| Shear, p.s.i | 2,300 | 2,311 | 1,275 | 2,116 | 2,190 |

Table III is similar to Table II except that it illustrates the lap shear strength attainable with adhesives compounded with $MAC_{18}$ as opposed to $MAC_6$. As can be seen by comparing Examples 10 and 11 with Example 12, the lap shear strength of a Cor-ten steel to Cor-ten steel bond was almost 100 percent greater when the laminae were cleaned by the procedure indicated as opposed to being sandblasted. Comparison of Examples 10 and 11 with Examples 13 and 14 indicates that the Cor-ten steel lap shear strength is only slightly higher than the aluminum lap shear strength when $MAC_{18}$ is employed as the epoxy resin hardener.

Some insight as to the desirability of employing an accelerator, such as N,N-dimethylbenzylamine (DMBA) may be gleaned from a consideration of Table IV which discloses various Cor-ten to Cor-ten bond strengths obtained from a series of experiments. The metal was acid cleaned as described in Examples 1 to 4. The data was obtained by using three separate cure conditions using $MAC_x$ ranging from $MAC_2$ through $MAC_{18}$. For each experiment, $A/E$ was 0.5 and the concentrations of the Al and Si fillers were 100 phr. and 15 phr., respectively. The tensile lap shear strengths (p.s.i.) resulting from these three studies are set forth as follows:

TABLE VI

| | Pounds per square inch | | |
|---|---|---|---|
| Curing conditions | A | B | C |
| $MAC_x$, x is: | | | |
| 2 | | | 3,260 |
| 3 | | | 2,435 |
| 5 | | 1,000 | |
| 6 | 3,000 | 2,200 | 1,700 |
| 10 | 2,120 | 2,120 | 1,525 |
| 14 | 2,025 | 2,025 | 1,515 |
| 18 | 2,300 | | |

NOTE.—A = Cured 24 hours at 120° C. without accelerator. B = Cured 2 hours at 200° C. without accelerator. C = Cured 24 hours at 120° C. with 3 phr. N,N-dimethylbenzylamine (DMBA) as an accelerator.

In analyzing the table, A shows that tensile lap shear (TLS) strengths of 2,000 to 3,000 p.s.i. can be obtained when $MAC_6$ to $MAC_{18}$ formulations are heat cured without accelerator. The highest TLS value under these conditions was obtained with $MAC_6$. B shows essentially the same results except for $MAC_6$, which is considerably lower in TLS strength, and $MAC_5$ which gave a very poor TLS (about 1,000 p.s.i.). Significantly, $MAC_2$ and $MAC_3$ were insoluble and non-reactive under the conditions represented. However, when 3 phr. DMBA accelerator was added and the curing conditions of C were followed, two unexpected results were observed. The $MAC_2$ and $MAC_3$, which were originally insoluble, reacted to give adhesives of good TLS strength of 3,250 and 2,430 p.s.i., respectively. The polymers above $MAC_6$ gave TLS values lower than those recorded without an accelerator. $MAC_5$, which gave poor results without accelerator, gave good TLS values with accelerator.

From these results it can be said the size of the olefinic portion of the $MAC_x$ polymer has a significant effect on the solubility and reactivity of the polymer with polyepoxides. The use of DMBA accelerator had little effect on the $MAC_6$ to $MAC_{18}$ polymers, but greatly increased the reactivity of $MAC_2$, $MAC_3$ and $MAC_5$.

The effect of the molecular weight of the $MAC_x$ polymers on the TLS strength can be determined by providing a series of runs wherein different molecular weight polymers are employed. However, it should be understood that the results obtained for any particular $MAC_x$, for example $MAC_2$, are not necessarily indicative of the results to be expected when other $MAC_x$, such as $MAC_6$ or $MAC_{18}$, polymers are employed. Bearing this in mind, a series of runs were conducted wherein Epon 828 was hardened with a variety of $MAC_2$ copolymers. In each run, $A/E$, was maintained at 0.5 and either a low molecular weight $MAC_2$, a high molecular weight $MAC_2$ or a cross-linked high molecular weight $MAC_2$ was employed as the hardener. In addition, 3 phr. of DMBA was used in each run as the accelerator. The laminae were made from Cor-ten steel. The results of these runs are set forth in Table V.

TABLE V

| Example | MAC₂ polymer | Curing condition Hours | Curing condition Temp., °C. | Shear strength, p.s.i. |
|---|---|---|---|---|
| 15 | Low mol. wt. | 24 | 120 | 3,250 |
| 16 | High mol. wt. | 2 | 200 | 420 |
| 17 | High mol. wt. (cross-linked) | 2 | 200 | 560 |

As illustrated in Table V only the low molecular weight MAC₂ copolymer resulted in a good adhesive. The high molecular weight MAC₂ and the cross-linked high molecular weight MAC₂ copolymers were relatively insoluble in the epoxy resin and even the addition of DMBA and the use of high cure temperatures were ineffective in accelerating the cure reaction.

The principles of the invention being thus described, it should be understood that various modifications may be made thereto without departing from the spirit and scope thereof.

We claim:

1. A thermo-curable adhesive composition comprising a spreadable suspension of:

a copolymer of a straight-chain monoolefin having between 2 and about 20 carbon atoms and maleic anhydride and having the structural formula:

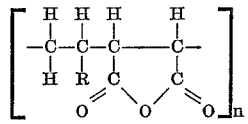

wherein $n$ is an integer of from 2 to about 100, R is hydrogen, halogen or a straight chain alkyl or halogenated alkyl group having from 1 to about 18 carbon atoms, said copolymer having a dilute solution viscosity between about 0.05 and about 2.0;

a liquid polyepoxide, the amount of said liquid polyepoxide being such that the anhydride to epoxide equivalents ratio is between about 0.1 and about 1.5; and a powdered filler suspended therein, the amount of said filler being at least about 30 parts per hundred parts by weight of polyepoxide.

2. The composition of claim 1 comprising a tertiary amine accelerator when the said olefin has between 2 and 5 carbon atoms per molecule, the amount of said accelerator being at least about 0.5 parts per hundred parts by weight of polyepoxide.

3. The composition of claim 1 in which the filler comprises powdered aluminum.

4. The composition of claim 3 in which the filler is powdered aluminum and pyrogenic collodial silica.

5. The composition of claim 1 in which the said ratio of anhydride to epoxide equivalents is about 0.5.

6. An article of manufacture comprising two solid elements bonded together with a solidified adhesive composition prepared from the materials comprising a spreadable suspension of:

a copolymer of a straight-chain alpha olefin having between 2 and about 20 carbon atoms and maleic anhydride and having the structural formula:

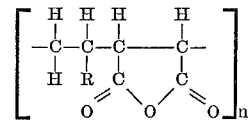

wherein $n$ is an integer of from 2 to about 100, R is hydrogen, halogen or a straight chain alkyl or halogenated alkyl group having from 1 to about 18 carbon atoms, said copolymer having a dilute solution viscosity between about 0.05 and about 2.0; and a liquid polyepoxide, the amount of said liquid polyepoxide being such that the anhydride to epoxide equivalents ratio is between about 0.1 and about 1.5; and a powdered filler suspended therein, the amount of said filler being at least about 30 parts per hundred parts by weight of polyepoxide.

7. The article of claim 6 in which at least one of said solid elements is metallic.

8. In a method of laminating two solid elements by juxtaposing the elements with a layer of adhesive therebetween, and curing the adhesive, the improvement in which the adhesive has the composition of claim 1.

9. The method of claim 8 in which said composition comprises a tertiary amine accelerator when the said olefin has between 2 and 5 carbon atoms per molecule, the amount of said accelerator being at least about 0.5 part per hundred parts by weight of polyepoxide.

10. The method of claim 8 in which the filler is a mixture of powdered aluminum and pyrogenic colloidal silica.

11. The method of claim 9 in which curing is initiated at a temperature of above about 80° C.

References Cited

UNITED STATES PATENTS

| 3,297,784 | 1/1967 | Snedeker et al. | 260—836 X |
| 3,374,209 | 3/1968 | Hay et al. | 260—78.4 E P |
| 3,375,300 | 3/1968 | Ropp | 260—836 X |

LEWIS T. JACOBS, Primary Examiner

U.S. Cl. X.R.

260—37 EP, 836